(12) United States Patent
Wu et al.

(10) Patent No.: US 7,424,596 B2
(45) Date of Patent: Sep. 9, 2008

(54) CODE INTERPRETATION USING STACK STATE INFORMATION

(75) Inventors: Gansha Wu, Beijing (CN); Guei-Yuan Lueh, San Jose, CA (US); Jinzhan Peng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 10/813,599

(22) Filed: Mar. 31, 2004

(65) Prior Publication Data

US 2005/0223370 A1    Oct. 6, 2005

(51) Int. Cl.
G06F 9/30    (2006.01)
(52) U.S. Cl. ...................................................... 712/202
(58) Field of Classification Search ................. 712/202, 712/209, 227
See application file for complete search history.

(56) References Cited

U.S. PATENT DOCUMENTS

| 3,200,379 | A | * | 8/1965 | King et al. ................... 712/202 |
| 5,333,283 | A | * | 7/1994 | Emma et al. ................. 712/236 |
| 5,734,908 | A | * | 3/1998 | Chan et al. ................... 717/154 |
| 5,903,899 | A | * | 5/1999 | Steele, Jr. .................... 707/206 |
| 6,075,942 | A | * | 6/2000 | Cartwright, Jr. ............. 717/138 |
| 6,292,935 | B1 | * | 9/2001 | Lueh et al. ................... 717/148 |
| 6,298,434 | B1 | * | 10/2001 | Lindwer ....................... 712/209 |
| 6,606,743 | B1 | * | 8/2003 | Raz et al. ..................... 717/148 |
| 6,993,761 | B1 | * | 1/2006 | Czajkowski et al. ......... 718/100 |
| 7,000,094 | B2 | * | 2/2006 | Nevill et al. ................. 712/209 |
| 2002/0066004 | A1 | * | 5/2002 | Nevill et al. ................. 712/209 |
| 2003/0192035 | A1 | * | 10/2003 | Duesterwald ald .......... 717/138 |
| 2004/0015912 | A1 | * | 1/2004 | Bottomley ................... 717/148 |

FOREIGN PATENT DOCUMENTS

CN    1440528 A    9/2003

OTHER PUBLICATIONS www.dictionary.com "The American Heritage Dictionary of the English Language". 4th Edition © 2006 search terms: shared, cascaded.*
Tanenbaum, Andrew S. "Structured Computer Organization". Second Edition. Englewood Cliffs, NJ: Prentice-Hall, Inc., © 1984. pp. 10-12.*

* cited by examiner

*Primary Examiner*—Aimee J Li
(74) *Attorney, Agent, or Firm*—Venable LLP; James R. Burdett

(57) ABSTRACT

Executing an instruction on an operand stack, including performing a stack-state aware translation of the instruction to threaded code to determine an operand stack state for the instruction, dispatching the instruction according to the operand stack state for the instruction, and executing the instruction.

20 Claims, 4 Drawing Sheets

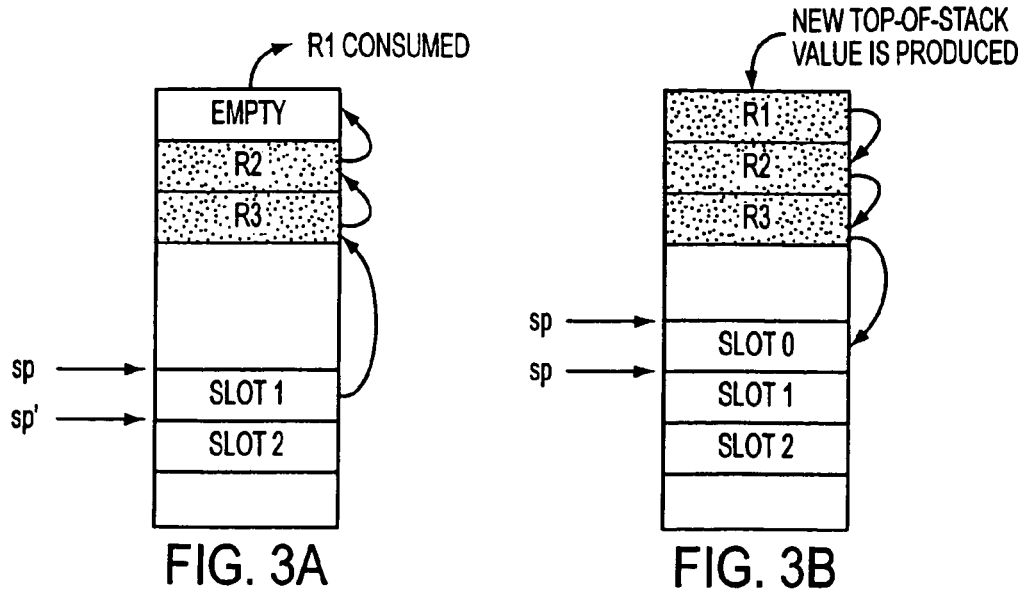
FIG. 3A    FIG. 3B
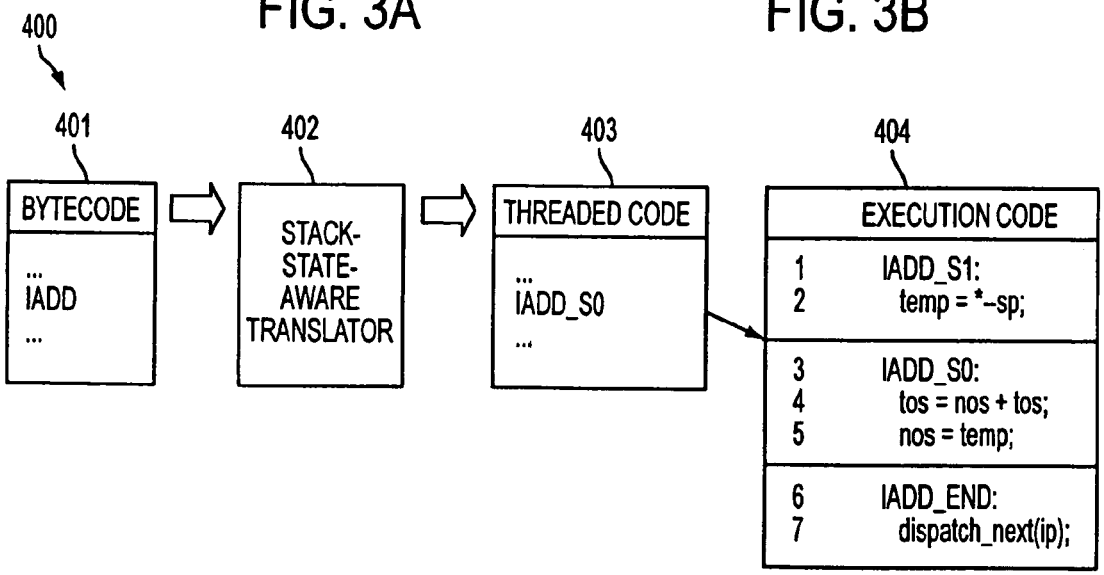
FIG. 4
```
OP_Sk  : SOk       // the k Shift Operation
OP_Sk-1: SOk-1     // the k-1 Shift Operation
.......
OP_S0  : EC(OP)    // Execution Code for OP
         RO        // Refill Operation
         ID        // Instruction Dispatching
```
FIG. 5

OP_S2: *sp++ = nos;
OP_S1: nos = tos;
OP_S0: EC(OP)
    ID a. [X, Y] = [0,1]

FIG. 6A

OP_S2: *sp++ = nos;
OP_S1: *sp++ = tos;
OP_S0: EC(OP)
    ID b. [X, Y] = [0,2]

FIG. 6B

OP_S1: temp = *--sp;
OP_S0: EC(OP)
    tos = nos;
    nos = temp;
    ID c. [X, Y] = [1,0]

FIG. 6C

OP_S1: temp = *--sp;
OP_S0: EC(OP)
    nos = temp;
    ID d. [X, Y] = [2,1]

FIG. 6D

OP_S1: *sp++ = nos;
OP_S0: EC(OP)
    ID e. [X, Y] = [1,2]

FIG. 6E

OP_S1: *sp++ = nos;
OP_S0: EC(OP)
    ID e. [X, Y] = [1,2]

FIG. 6F

OP_S2: temp2 = *(--sp-1);
    *(sp-1) = *sp;
OP_S1 temp1 = *--sp;
OP_S0: EC(OP)
    tos = temp1;
    nos = temp2;
    ID g. [X, Y] = [2,0]

FIG. 6G

CODE INTERPRETATION USING STACK STATE INFORMATION

BACKGROUND OF THE INVENTION

Interpretation is one of the broadly used technologies to implement Virtual Machine (VM) and runtime systems, with the benefits of portability and maintainability. VMs, runtime systems, and other high level language processors, such as Java Processors, incorporate a stack caching scheme to virtually map bytecode, for example, to an operand stack. One type of stack caching scheme, a mixed stack, may use physical registers and a contiguous memory region as an operand stack. An interpreter plays an important role in many runtime systems. Many modern programming languages, such as Java, Forth, Perl, and Python are still employing various interpreters as their execution engines when they are programmed and run on memory/computation constraint devices, for example.

The interpretation of stack-based languages may rely on an auxiliary data structure, e.g., operand stack, on which the executions of instructions are operated. Accessing the operand stack may involve memory accesses. In various methods to improve the performance of interpretation. Among those methods, stack caching may be an efficient approach to eliminate most of the accesses to the operand stack and is able to speedup interpretation. Stack caching may promote top-of-stack operands to registers, which may reduce the number of memory accesses and results in higher instructions per cycle.

To manipulate different states of a mixed stack, for example, a stack-caching interpreter may maintain many copies of execution code for each VM instruction. Such a design incurs code explosion which may consume excessive memory and introduce maintenance complexity.

BRIEF DESCRIPTION OF THE DRAWINGS

Various exemplary features and advantages of embodiments of the invention will be apparent from the following, more particular description of exemplary embodiments of the present invention, as illustrated in the accompanying drawings wherein like reference numbers generally indicate identical, functionally similar, and/or structurally similar elements.

FIG. 3A depicts an exemplary embodiment of a method according to an embodiment of the invention;

FIG. 3B depicts an exemplary embodiment of a method according to an embodiment of the invention;

FIG. 4 depicts an exemplary embodiment of a method according to an embodiment of the invention;

FIG. 5 depicts an exemplary embodiment of a code layout according to an embodiment of the invention;

FIG. 6A depicts an exemplary embodiment of a code layout according to an embodiment of the invention;

FIG. 6B depicts an exemplary embodiment of a code layout according to an embodiment of the invention;

FIG. 6C depicts an exemplary embodiment of a code layout according to an embodiment of the invention;

FIG. 6D depicts an exemplary embodiment of a code layout according to an embodiment of the invention;

FIG. 6E depicts an exemplary embodiment of a code layout according to an embodiment of the invention;

FIG. 6F depicts an exemplary embodiment of a code layout according to an embodiment of the invention;

FIG. 6G depicts an exemplary embodiment of a code layout according to an embodiment of the invention;

DETAILED DESCRIPTION OF EXEMPLARY EMBODIMENTS OF THE PRESENT INVENTION

Exemplary embodiments of the invention are discussed in detail below. While specific exemplary embodiments are discussed, it should be understood that this is done for illustration purposes only. A person skilled in the relevant art will recognize that other components and configurations may be used without parting from the spirit and scope of the invention.

Embodiments of the present invention may provide a code sharing mechanism for stack caching that avoids code duplication. A stack caching scheme may use a mixed register-stack model, i.e. a mixed stack, that virtually maps to a bytecode (e.g., Java or CLI) operand stack. The mixed stack may consist of two parts: a register stack and a memory stack. The register stack may be comprised of physical registers that may hold several top elements of the operand stack. The memory stack may be a contiguous memory region that may hold the rest of elements of the operand stack.

Figure 1:
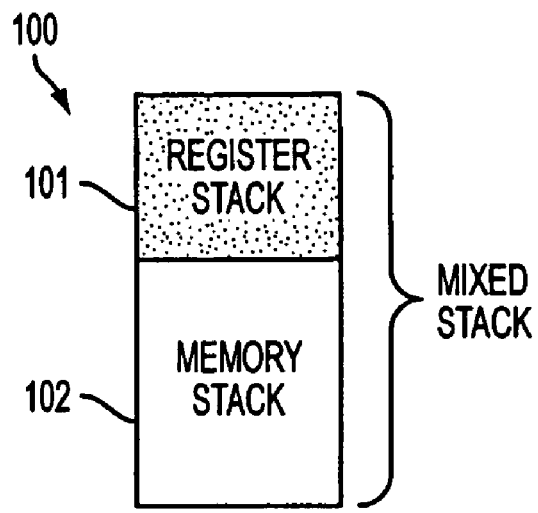
FIG. 1 depicts an exemplary embodiment of a mixed stack according to an embodiment of the invention.

FIG. 1 depicts an exemplary embodiment of a mixed stack 100. As shown in FIG. 1, mixed stack 100 may include a register stack 101 and a memory stack 102.

Figure 2:
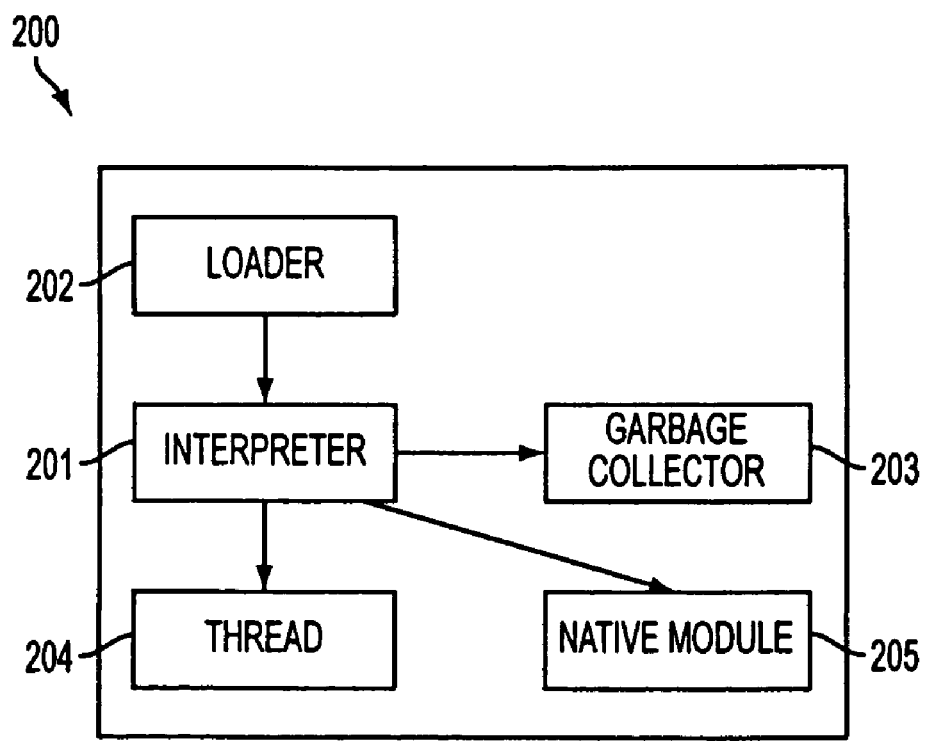
FIG. 2 depicts an exemplary embodiment of a system according to an embodiment of the invention.

FIG. 2 depicts an exemplary embodiment of a virtual machine architecture 200. Virtual machine architecture 200 may include interpreter 201, loader 202, garbage collector 203, thread 204, and native module 205. In an exemplary embodiment of the invention, interpreter 201 may include an arithmetic logic unit (ALU) (not shown), a stack (not shown), and memory (not shown). Interpreter 201 may use the aforementioned components to decode instructions and call appropriate functional units to carry out instructions. Loader 202 may be responsible for loading class files into memory, parsing the class files, and preparing bytecode instructions for interpreter 201. Interpreter 201 may be the execution engine of a VM, and may interpret instructions one at a time, for example. Garbage collector 203 may allocate new objects and reclaim useless objects. In an exemplary embodiment of the invention, thread 204 may support an application programming interface (API) and native module 205 may support the API for native library functions, for example.

In an exemplary embodiment of the invention, machine instructions may take operands from an operand stack, operate on them, and return results to the stack. A stack may be a 32-bit stack, for example, that may be used to pass parameters to methods and receive method results, as well as to supply parameters for operations and save operation results. In an exemplary embodiment of the invention, a stack may be a mixed stack as is described above.

In an exemplary embodiment of the invention, an interpreter, such as interpreter 201 may keep most, if not all, bytecode instructions to be operated on in a register stack instead of a memory stack. Doing so may reduce memory accesses and execution time of the instruction.

In an exemplary embodiment of the invention, the interpreter may need to perform shift operations to maintain the top-of-stack elements of the operand stack in the register stack. For example, if one instruction consumes the one register as is shown in FIG. 3A, the top-of-stack register R1 may be removed from the register stack, the resulting value of R2 may need to be shifted to the top, R3 to R2. Because the memory stack is not empty (register stack underflow), the value in slot 1 may also be shifted to R3 so as to keep the register stack fully loaded with values. The memory stack pointer (sp) may also be updated to sp' after slot1 is drained. On the other hand, as is shown in FIG. 3B, if one instruction generates one value that needs to be pushed onto the register stack, R1 may need to be vacated by shifting values down, i.e., R3 to slot 0 (register stack overflow), R2 to R3 and then R1 to R2.

While embodiments of the present invention are described in terms of the examples below, this description is for convenience only and is not intended to limit its application. In fact, after reading the following description, it will be apparent to one skilled in the relevant art(s) how to implement the following invention in alternative embodiments (e.g., in a Common Language Runtime Environment).

Furthermore, while the following description focuses interpreting JAVA bytecode, it is not intended to limit the application of the present invention. It will be apparent to one skilled in the relevant art how to implement the following invention, where appropriate, in alternative embodiments. For example, embodiments of the present invention may be applied, alone or in combination, with various virtual machine architectures, such as, but not limited to, Common Language Infrastructure and other virtual execution systems.

FIG. 4 illustrates how an interpreter may work with a mixed stack in an exemplary embodiment of the invention. In an exemplary embodiment of the invention, an instruction, such as a bytecode instruction may undergo a stack-state aware translation into threaded code, which may indicate an entry point into cascading execution code for executing the instruction.

FIG. 4 depicts an exemplary embodiment of a transition 400 of an instruction from bytecode, for example, to cascading execution code. As shown in FIG. 4, prior to interpreting a method the first time, a bytecode instruction 401 may be passed to or interpreted by a stack-state-aware translator 402. The stack-state-aware translator 402 may produce threaded code 403. Based on the threaded code 403, the instruction 401 may be dispatched according to the operand stack state of the instruction. In an exemplary embodiment of the invention, when an instruction is dispatched according the operand stack state of the instruction, the entry point into cascading execution code 404 may be determined and the instruction may be executed from that entry point.

In an exemplary embodiment of the invention, the stack state may be embodied by the number of shift operations that are needed after the execution of the instruction. As used herein, $\eta(i)$ denotes the number of shift operations that are needed after the execution of instruction i. For example, referring to FIG. 3B, there are three shift operations in FIG. 3B.

To illustrate the method as described with respect to FIG. 4, the integer add instruction, iadd, may be used as an example to explain exemplary embodiments of the code-sharing mechanism. In an exemplary embodiment of the invention, a register stack may consist of 2 registers, for example, that include a top-of-stack (tos) register and a next-top-of-stack (nos) register. For the instruction iadd, there may be two possible stack states, depending on $\eta(iadd)$, for executing iadd. The IADD_S1 on line 1 of execution code 404 in FIG. 4 may represent the case of interpreting IADD when $\eta(iadd)=1$ and IADD_S0 on line 3 in execution code 404 may correspond to the case with $\eta(iadd)=0$.

In considering the case $\eta(iadd)=1$, $\eta(iadd)=1$ may occur when an operand stack has more than two elements. In other words, $\eta(iadd)=1$ may occur when the memory stack is not empty and the register stack is full. Because the instruction iadd consumes two operands, (i.e., tos and nos respectively) and produces one (new tos), there may only be one shift operation required to move the top item on the memory stack to the register stack as the new nos. The iadd instruction may then be dispatched to line 1 of the IADD_S1 case (as shown in FIG. 4). Line 2 of the IADD_S1 case may pop the top element of the memory stack to a temp register, for example. The execution may then fall through to the IADD_S0 case, in which the register-wise add operation (line 4) may interpret the integer add operation. Line 5 may refill nos by moving temp to nos to keep the top two elements of the operand stack in registers, for example. As described herein, the combination of lines 2 and 5 may constitute the shift operation.

In considering the case $\eta(iadd)=0$, $\eta(iadd)=0$ may occur when the operand stack has only two elements (both are in the register stack). In such a case, no shift operation may be needed because there may only be one element left as the result of the add operation. iadd may be dispatched to IADD_S0 (tos will be the only stack item after execution). As described above, line 4 may interpret the integer add operation. Execution of the refilling statement (line 5) may then become useless and redundant, but may not affect the correctness of the program because only tos may be a legitimate item after execution of IADD. In such a case, the performance penalty may be trivial for the nature of register-register assignment.

As is shown and described, IADD_S0 and IADD_S1 may share the same execution code to avoid excessive code duplication. In an exemplary embodiment of the invention, execution code and instruction dispatching for various stack states may be reused with a comprehensively designed layout. In such an embodiment, during the code-threading phase, the stack state for each instruction may be inferred, and then the instruction may be directly dispatched to the appropriate execution entry without a runtime table lookup, for example. Additionally, the translation phase may perform some optimizations to improve the sequence of interpretation.

FIG. 5 depicts an exemplary code layout 500 according to an exemplary embodiment of the invention. As shown in FIG. 5, $OP\_S_k$ denotes the interpretation entry point for an instruction that has an opcode OP and needs k ($\eta(i)=k$) shift operations to maintain the operand stack after the execution of i. The general code layout of all VM instructions may be illustrated as is shown in FIG. 5, for example.

In FIG. 5, $SO_k$ is the code that corresponds to the shift operation for $OP\_S_k$. In $SO_k$, the shifted elements may be moved to the register stack (RO) after execution of the operation. In an exemplary embodiment of the invention, $OP\_S_k$ may also execute all the code of its subsequent entries, $OP\_S_0$ to $OP\_S_{k-1}$. That is, in such an embodiment, the code of $OP\_S_0$ to $OP\_S_{k-1}$ may be shared. ID is the code that calls the next instruction.

As an example, consider the case of register stack size M=2 (i.e., there are 2 registers in the register stack as described above). The property of an instruction i may be defined as [X(i), Y(i)], where X(i) denotes the number of operands that i consumes and Y(i) denotes the number of stack items that i produces. FIGS. 6A-6G enumerate all possible code layouts for of $0 \leq X(i) \leq M$ and $0 \leq Y(i) \leq M$. As an example, the previous iadd example falls into the category of FIG. 6D.

For the instructions whose X(i)>M or Y(i)>M, a similar style of code layout may still be applied. In an exemplary embodiment of the invention, when X(i)>M or Y(i)>M, more register-memory shift operations may need to be performed before the execution code.

As is shown in FIGS. 6A-6G, each code layout represents a particular category [X(i), Y(i)], where X(i) denotes the number of operands that i consumes and Y(i) denotes the number of stack items that i produces. In an exemplary embodiment of the invention, the stack-state-aware translation phase may complement the code layout design. In such an embodiment, the stack-state-aware translation may happen before the instruction is executed. The translator may walk through the bytecode of the instruction in a pseudo-execution manner, for example, and generate the appropriate threaded bytecode entry for each instruction. At each execution point, the translator may be aware of the operand stack state and [X(i), Y(i)] property of the current instruction i. Accordingly the translator may infer η(i) based on a static table lookup or on a calculation result of a comprehensive formula, such as f(Depth(opstack), M, X(i), Y(i)).

In the described embodiments, the correctness of the stack-state-aware translation may be based on the fact that the stack depth before and after each bytecode instruction can be determined statically (runtime invariant). Such translation may only need one pass for a majority of bytecode instructions. Such embodiments may enable more optimization opportunities that are exposed during the translation.

Figure 7:
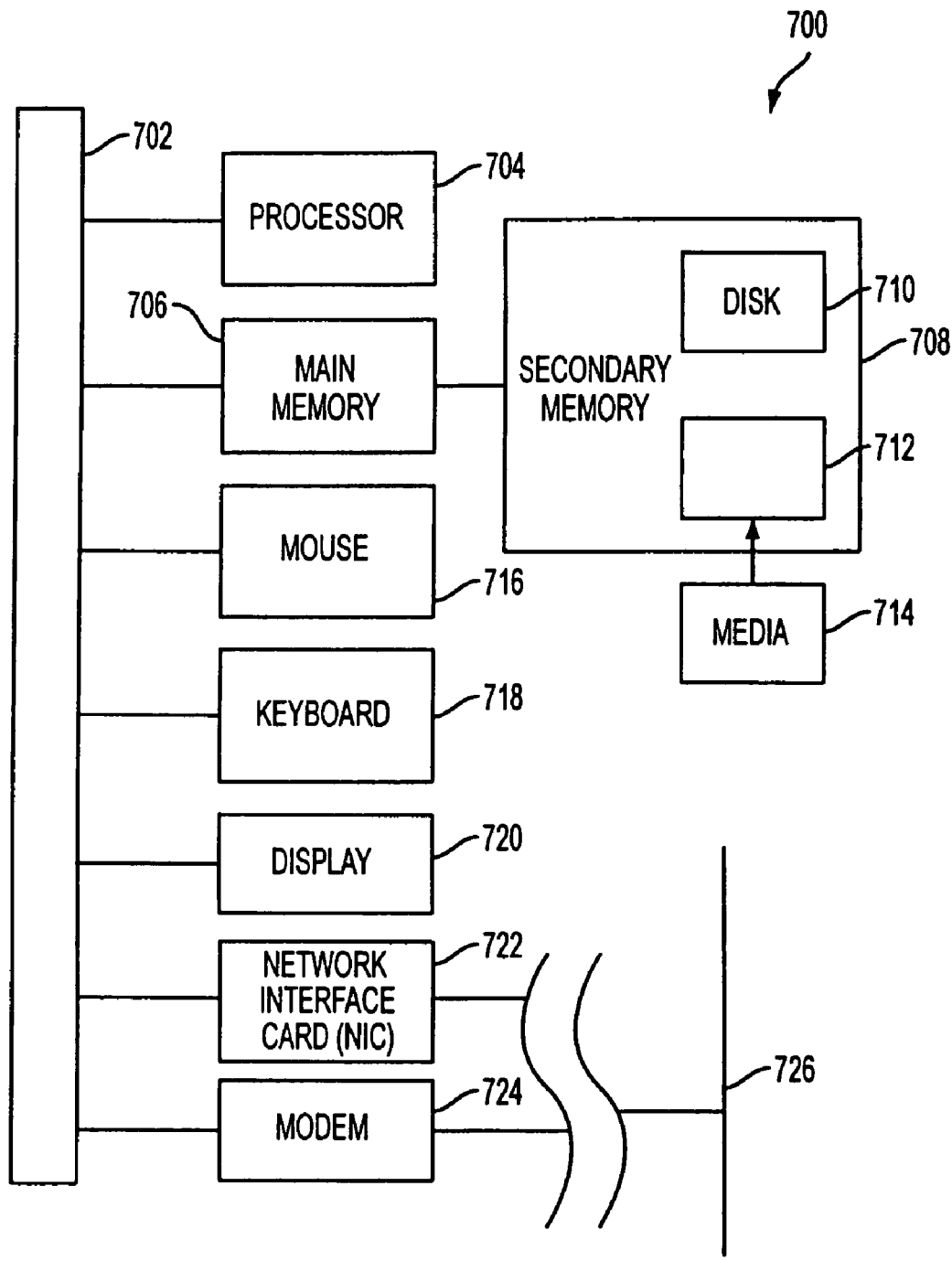
FIG. 7 depicts an exemplary embodiment of a computer and/or communications system as can be used for several components in an embodiment of the invention.

FIG. 7 depicts an exemplary embodiment of a computer and/or communications system as may be used to incorporate several components of the system in an exemplary embodiment of the present invention. FIG. 7 depicts an exemplary embodiment of a computer 700 as may be used for several computing devices in exemplary embodiments of the present invention. Computer 700 may include, but is not limited to: e.g., any computer device, or communications device including, e.g., a personal computer (PC), a workstation, a mobile device, a phone, a handheld PC, a personal digital assistant (PDA), a thin client, a fat client, an network appliance, an Internet browser, a paging, or alert device, a television, an interactive television, a receiver, a tuner, a high definition (HD) television, an HD receiver, a video-on-demand (VOD) system, a server, or other device.

Computer 700, in an exemplary embodiment, may comprise a central processing unit (CPU) or processor 704, which may be coupled to a bus 702. Processor 704 may, e.g., access main memory 706 via bus 702. Computer 700 may be coupled to an Input/Output (I/O) subsystem such as, e.g., a network interface card (NIC) 722, or a modem 724 for access to network 726. Computer 700 may also be coupled to a secondary memory 708 directly via bus 702, or via main memory 706, for example. Secondary memory 708 may include, e.g., a disk storage unit 710 or other storage medium. Exemplary disk storage units 710 may include, but are not limited to, a magnetic storage device such as, e.g., a hard disk, an optical storage device such as, e.g., a write once read many (WORM) drive, or a compact disc (CD), or a magneto optical device. Another type of secondary memory 708 may include a removable disk storage device 712, which can be used in conjunction with a removable storage medium 714, such as, e.g. a CD-ROM, or a floppy diskette. In general, the disk storage unit 710 may store an application program for operating the computer system referred to commonly as an operating system. The disk storage unit 710 may also store documents of a database (not shown). The computer 700 may interact with the I/O subsystems and disk storage unit 710 via bus 702. Such main memory, secondary memory, disk storage units, and removable disk storage devices are all non-limiting examples of what may be termed, "machine accessible media." The bus 702 may also be coupled to a display 720 for output, and input devices such as, but not limited to, a keyboard 718 and a mouse or other pointing/selection device 716.

The embodiments illustrated and discussed in this specification are intended only to teach those skilled in the art various ways known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. A method to execute an instruction on an operand stack, the method comprising:

performing a stack-state-aware translation of the instruction to threaded code to determine an operand stack state for the instruction, including determining an entry point into cascading execution code based on the stack state, wherein said cascading execution code comprises a plurality of tiers of execution code which are enterable at any tier, each tier comprising at least one computer-executable instruction;

dispatching the instruction according to the operand stack state for the instruction; and executing the instruction, wherein the execution comprises entering the cascading execution code at an entry tier indicated by the determined entry point, wherein the entry tier is selected from any tier of the cascading execution code, and executing the entry tier and all tiers below the entry tier.

2. The method according to claim 1, said performing comprising:

determining a number of operands on the operand stack before the instruction is executed;

determining a number of operands on the operand stack after the instruction is executed based on a number of operands that the instruction consumes and a number of operands that the instruction produces; and inferring a number of shift operations required after execution of the instruction to maintain top-of-stack elements.

3. The method according to claim 2, wherein the number of shift operations required after execution of the instruction is based on the number of operands on the operand stack before the instruction is executed and the number of operands on the operand stack after the instruction is executed.

4. The method according to claim 2, wherein the number of shift operations required after execution of the instruction is inferred based on a static lookup table.

5. The method according to claim 1, wherein the operand stack is a mixed-register stack.

6. The method according to claim 1, wherein the operand stack state comprises a number of shift operations to maintain top-of-stack elements of the operand stack after the execution of the instruction.

7. The method according to claim 6, wherein the top-of-stack elements comprise a register stack.

8. The method according to claim 1, further comprising: refilling the operand stack.

9. A system comprising:

an operand stack to execute an instruction; and an interpreter to determine a state of the operand stack, translate the instruction into threaded code, and dispatch the instruction based on the state of the operand stack, wherein said interpreter is further to determine an entry point into cascading execution code based on the stack state, wherein an entry tier indicated by the entry point is selected from any tier of the cascading execution code and all tiers below the entry tier are executed.

10. The system according to claim 9, wherein the operand stack is a mixed stack comprising a register stack and a memory stack.

11. The system according to claim 10, wherein the register stack comprises at least one register to hold at least one respective top element of the stack and the memory stack comprises a contiguous memory region to hold the remaining elements of the operand stack.

12. A machine accessible medium containing program instructions that, when executed by a processor, cause the processor to perform a series of operations comprising:
   translating a virtual machine instruction into threaded code based on an operand stack state of the virtual machine instruction, including determining an entry point into cascading execution code based on the stack state, wherein said cascading execution code comprises a plurality of tiers of execution code which are enterable at any tier, each tier comprising at least one computer-executable instruction, and wherein an entry tier indicated by the entry point is selected from any tier of the cascading execution code;
   dispatching the virtual machine instruction according to the operand stack state; and
   executing the instruction, wherein all tiers below the entry tier are executed.

13. The machine accessible medium according to claim 12, wherein the threaded code is based on an entry point into cascading execution code.

14. The machine accessible medium according to claim 12, further containing program instructions that, when executed by the processor cause the processor to perform further operations comprising:
   determining a number of operands that are present on an operand stack at a time before the virtual machine instruction is executed;
   determining a number of operands that are present on the operand stack at a time after the virtual machine instruction is executed; and
   inferring a number of shift operations required to maintain top-of-stack elements after the virtual machine instruction is executed.

15. The machine accessible medium according to claim 13, wherein the wherein the number of shift operations required after execution of the instruction is based on the number of operands present on the operand stack at a time before the instruction is executed and the number of operands present on the operand stack at a time after the instruction is executed.

16. The machine accessible medium according to claim 13, wherein the number of shift operations required after execution of the instruction is inferred based on a static lookup table.

17. The machine accessible medium according to claim 12, wherein the operand stack state comprises a number of shift operations to maintain top-of-stack elements of an operand stack after execution of the virtual machine instruction.

18. The machine accessible medium according to claim 17, wherein the top-of-stack elements comprise a register stack.

19. The machine accessible medium according to claim 12, further containing program instructions that, when executed by the processor cause the processor to perform further operations comprising:
   execute a number of shift operations to replace top-of-stack elements to an operand stack.

20. The machine accessible medium according to claim 19, wherein the number of shift operations is based on a number of elements on the operand stack that are consumed by the virtual machine instruction and a number of elements that are produced by the virtual machine instruction.

* * * * *